(12) United States Patent
Yoshida

(10) Patent No.: US 10,589,608 B2
(45) Date of Patent: Mar. 17, 2020

(54) VEHICLE RETRACTABLE ROOF

(71) Applicant: WEBASTO JAPAN CO., LTD., Higashihiroshima-shi, Hiroshima (JP)

(72) Inventor: Syuji Yoshida, Higashihiroshima (JP)

(73) Assignee: WEBASTO JAPAN CO., LTD., Hiroshima (JP)

( * ) Notice: Subject to any disclaimer, the term of this patent is extended or adjusted under 35 U.S.C. 154(b) by 57 days.

(21) Appl. No.: 16/084,914

(22) PCT Filed: Feb. 27, 2017

(86) PCT No.: PCT/JP2017/007534
§ 371 (c)(1),
(2) Date: Sep. 13, 2018

(87) PCT Pub. No.: WO2017/159327
PCT Pub. Date: Sep. 21, 2017

(65) Prior Publication Data
US 2019/0077238 A1    Mar. 14, 2019

(30) Foreign Application Priority Data

Mar. 18, 2016   (JP) .................. 2016-055363

(51) Int. Cl.
*B60J 7/14*   (2006.01)
*B60J 7/12*   (2006.01)
*B60J 7/20*   (2006.01)

(52) U.S. Cl.
CPC .............. *B60J 7/145* (2013.01); *B60J 7/12* (2013.01); *B60J 7/20* (2013.01); *B60J 7/202* (2013.01)

(58) Field of Classification Search
CPC ....... B60J 7/145; B60J 7/12; B60J 7/20; B60J 7/202
See application file for complete search history.

(56) References Cited

U.S. PATENT DOCUMENTS 2,852,292 A * 9/1958 Galla .................... B60J 7/1851
  292/25
5,197,778 A   3/1993 Burst

FOREIGN PATENT DOCUMENTS

| JP | H05-65028 A | 3/1993 | |
|----|-------------|--------|---|
| JP | 2001113951 A | * 4/2001 | ........... B60J 7/1856 |
| JP | 2009-007003 A | 1/2009 | |
| JP | 2013-006600 A | 1/2013 | |
| JP | 2012-086612 A | 5/2015 | |

* cited by examiner

*Primary Examiner* — Lori L Lyjak
(74) *Attorney, Agent, or Firm* — Maschoff Brennan

(57) ABSTRACT

If a roof member 12 of a vehicle retractable roof 11 is made of aluminum, a roof side stopper 65 is fixed to a reinforcing plate 50 together with a roof bracket 55, a contact surface 65 coming into contact with a vehicle side stopper 60 is disposed at a position except for a sealing surface 67 provided on the roof member 12. Then, the deformation of the roof member 12 can be reduced, the interference with the sealing surface can be avoided, and the weight of the roof side stopper 65 can be reduced.

3 Claims, 10 Drawing Sheets

VEHICLE RETRACTABLE ROOF

TECHNICAL FIELD

The present disclosure relates to a vehicle retractable roof, and more particularly to a retractable roof having a roof side stopper that comes into contact with a vehicle side stopper at a fully opened position in which a cabin is opened.

BACKGROUND ART

A typical vehicle retractable roof includes a roof drive mechanism having a link mechanism capable of changing positions of the roof member of the vehicle between a fully closed position in which a cabin is covered and a fully opened position in which a cabin is opened (see, e.g., Patent Document 1). In this retractable roof, the link mechanism may include a roof side stopper coming into contact with a vehicle side stopper at the fully opened position. In addition, in a typical structure, the roof member is made of a sufficiently strong material, and the roof side stopper also has a sufficiently strong structure using a molded article or the like using a synthetic resin material. This provides a good moldability to enable easily forming into any shape, and also the thick configuration provides a high strength.

CITATION LIST

Patent Document

Patent Document 1: Japanese Unexamined Patent Application Publication No. 2013-006600

SUMMARY

Technical Problem

It is conceivable to use a light metal material such as aluminum to reduce the weight of the roof member. However, if the roof side stopper is provided not on the link mechanism but on the roof member to increase the positional accuracy of the fully opened position, the roof member made of a light metal material has a weakened strength, and the roof side stopper which is a synthetic resin molded article has a higher strength. Thus, the roof member may be deformed, and the interference with the sealing surface of the roof member also has to be avoided. In addition, the synthetic resin molded article is thick to have a necessary strength, and thus the mass is heavy and it is difficult to reduce the weight.

In view of the foregoing, it is an object of the present disclosure to reduce the deformation of a roof member, avoid the interference with a sealing surface, and reduce the weight of a roof side stopper if a roof member of a vehicle retractable roof is made of a light metal material.

Solution to the Problem

In a first aspect of the present disclosure, a vehicle retractable roof includes a roof member, a back window, a roof drive mechanism capable of changing positions of the roof member and the back window between a fully closed position in which a cabin is covered and a fully opened position in which the cabin is opened, and a roof side stopper coming into contact with a vehicle side stopper at the fully opened position.

In this vehicle retractable roof, the roof member includes an outer panel located on an outer surface side of a vehicle body, an inner panel located on an inner surface side of the vehicle body, and a reinforcing plate fixed between the outer panel and the inner panel and supporting a roof bracket linked with an arm of a link mechanism of the roof driving mechanism. The roof side stopper is fixed to the reinforcing plate together with the roof bracket, and includes a contact surface coming into contact with the vehicle side stopper and disposed at a position except for a sealing surface provided on the roof member.

In this first aspect of the present disclosure, the reinforcing plate of the roof member supports the roof bracket linked with the arm of the link mechanism, and the reinforcing plate is fixed between the outer panel and the inner panel. Thus, even if the link mechanism is driven and the position of the reinforcing plate changes, the positions of the outer panel and the inner panel of the roof member do not change. Then, when the retractable roof is in the fully opened position, the roof side stopper fixed to the reinforcing plate comes into contact with the vehicle side stopper provided in the vehicle such that the position of the roof member is determined.

In a second aspect of the present disclosure similarly to the first aspect of the present disclosure, the vehicle retractable roof includes a roof member, a back window, a roof drive mechanism capable of changing positions of the roof member and the back window between a fully closed position in which a cabin is covered and a fully opened position in which the cabin is opened, and a roof side stopper coming into contact with a vehicle side stopper at the fully opened position.

In this vehicle retractable roof, the roof member includes an outer panel located on an outer surface side of a vehicle body, an inner panel located on an inner surface side of the vehicle body, and a reinforcing plate fixed between the outer panel and the inner panel and supporting a roof bracket linked with an arm of a link mechanism of the roof driving mechanism. The roof side stopper is integrated with the roof bracket, and includes a contact surface coming into contact with the vehicle side stopper and disposed at a position except for a sealing surface provided on the roof member.

In this second aspect of the present disclosure, the reinforcing plate of the roof member supports the roof bracket linked with the arm of the link mechanism, and the reinforcing plate is fixed between the outer panel and the inner panel. Thus, even if the link mechanism is driven and the position of the reinforcing plate changes, the positions of the outer panel and the inner panel of the roof member do not change. Then, when the retractable roof is in the fully opened position, the roof side stopper integrated with the reinforcing plate comes into contact with the vehicle side stopper provided in the vehicle such that the position of the roof member is determined.

Advantages of the Invention

According to the present disclosure, the reinforcing plate the roof member supports the roof bracket linked with the arm of the link mechanism, and the reinforcing plate is fixed between the outer panel and the inner panel. Thus, when the link mechanism is driven, the positions of the outer panel and the inner panel are changed via the reinforcing plate. Thus, in the present disclosure, the reinforcing plate receives the driving force of the link mechanism. The reinforcing plate also receives the force generated when the vehicle side stopper comes into contact with the roof side stopper. Thus, even if the outer panel of the roof member is made of a light metal material such as aluminum, the deformation of the outer panel can be reduced due to an excessively higher strength of the roof side stopper. Thus, the weight of the roof member can be reduced, and also the roof side stopper can be fixed to the roof member.

In a typical configuration in which a roof side stopper made of a synthetic resin is attached to a link mechanism, the roof side stopper has a high degree of freedom of molding, and thus the contact surface for a vehicle side stopper can be easily provided in any position. However, if the design is changed so that the roof member is made of a light metal and the roof side stopper is provided on the roof member, the contact surface is not easily provided in any position. On the other hand, according to the present disclosure, the roof side stopper is provided on the reinforcing plate, and thus the roof side stopper can be easily attached to the roof member even if the roof member is made of a light metal material.

In the present disclosure, as long as the contact surface of the roof side stopper is disposed at a position except for the sealing surface of the roof member, the roof side stopper itself can be formed in any shape. Thus, the roof side stopper can be easily formed from a sheet metal member. Thus, the weight of the roof side stopper itself can be more reduced than that of a typical one using a thick synthetic resin member. Accordingly, the weight of the retractable roof can be reduced as a whole.

According to the second aspect of the present disclosure, the roof side stopper is integrated with the reinforcing plate, and the same advantages as those of the first aspect of the present disclosure can be obtained. That is, also in this second aspect of the present disclosure, the reinforcing plate receives the driving force of the link mechanism. The reinforcing plate also receives the force generated when the roof side stopper comes into contact with the vehicle side stopper. Thus, even if the outer panel of the roof member is made of a light metal material such as aluminum, the deformation of the outer panel can be reduced due to an excessively higher strength of the roof side stopper. Thus, the weight of the roof member can be reduced, and also the roof side stopper can be fixed to the roof member. In addition, the roof side stopper is provided integrally with the reinforcing member, and thus is unnecessary to be formed from a thick synthetic resin member. Thus, the weight of the roof side stopper can also be reduced, and the weight of the retractable roof can be reduced as a whole.

DETAILED DESCRIPTION

Embodiments of the present disclosure will be described in detail below, with reference to the drawings. This embodiment relates to a vehicle having a retractable roof of the present disclosure. Note that the following description of embodiments is merely examples in nature, and is not intended to limit the scope, application, or uses of the present disclosure.

Figure 1:
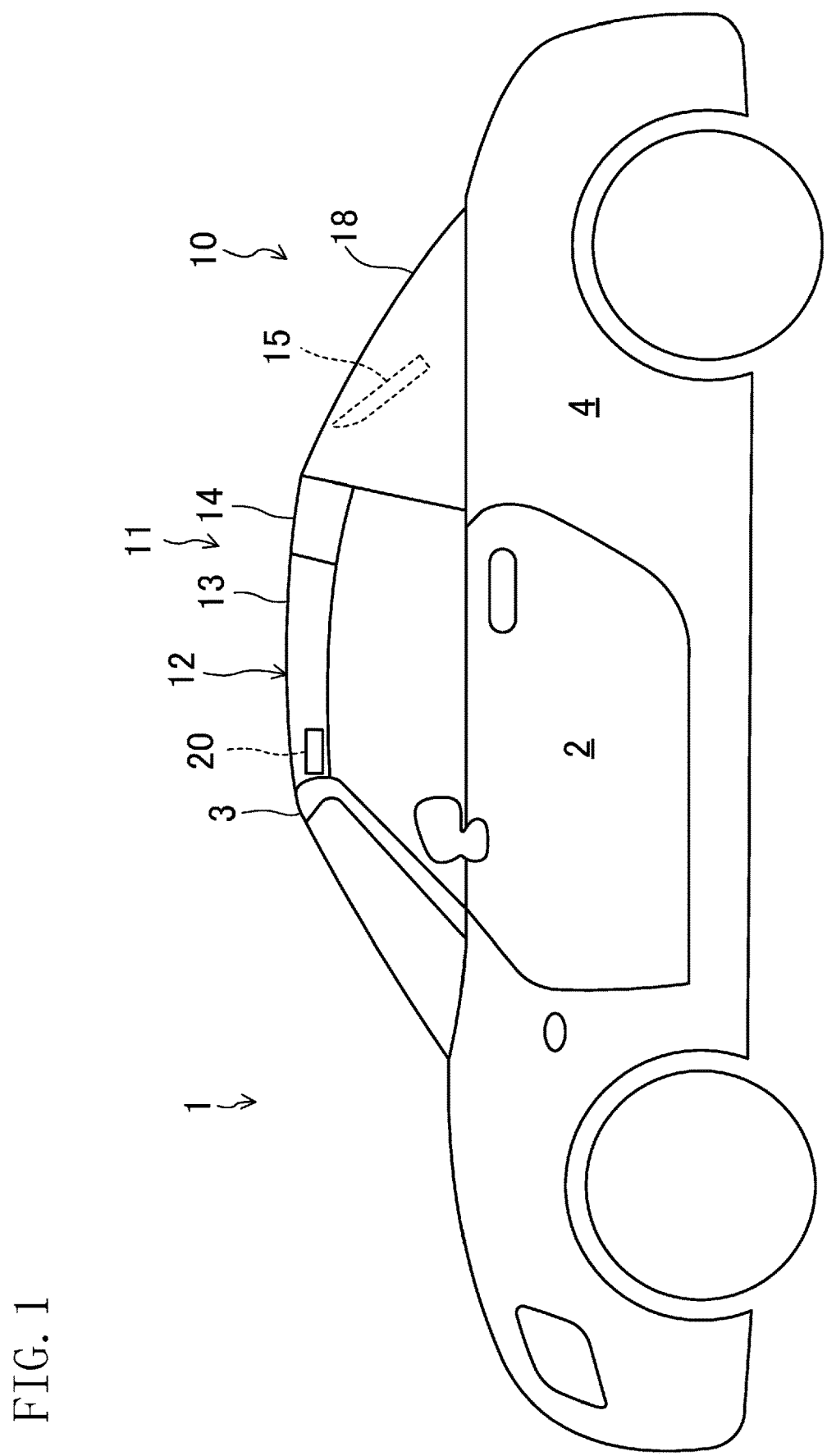
FIG. 1 is a schematic side view showing a general configuration of a vehicle according to an embodiment of the present disclosure, and showing a closed state of a cabin.
Figure 2:
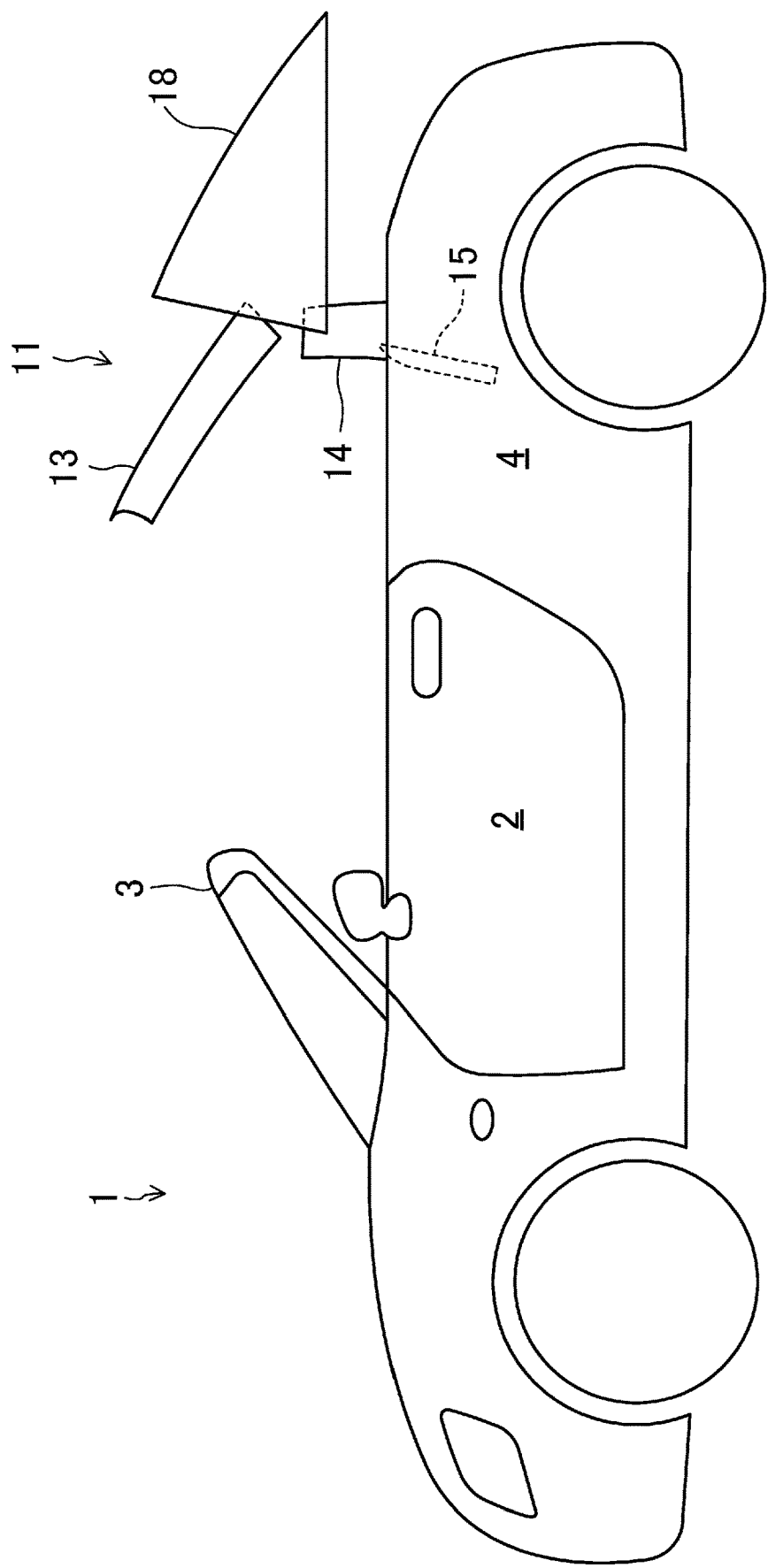
FIG. 2 is a schematic side view showing the general configuration of the vehicle according to the embodiment, and showing that a retractable roof and a back window are located between a use position and a retracted position, and a deck cover is at a retreated position.
Figure 3:
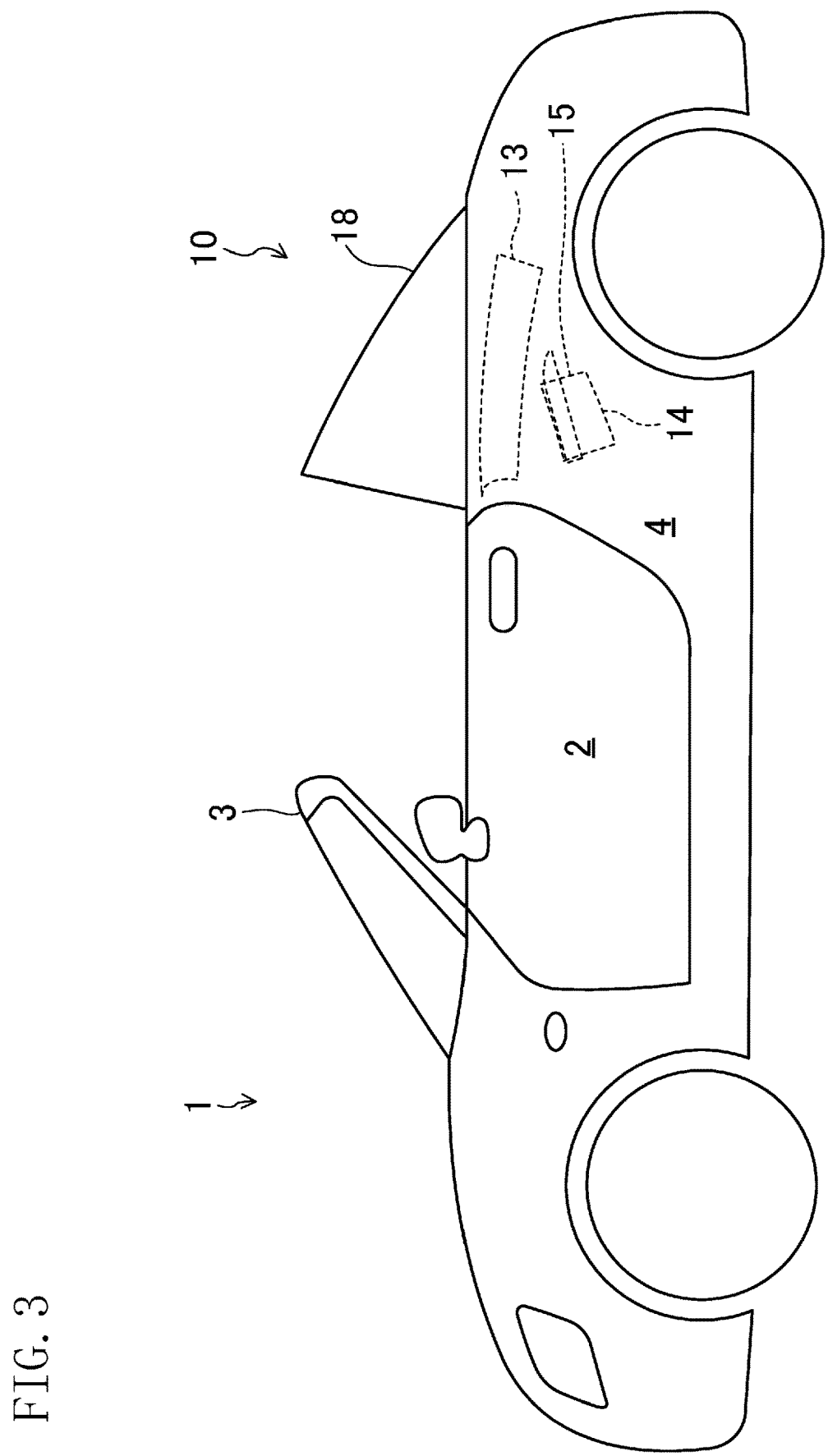
FIG. 3 is a schematic side view showing the general configuration of the vehicle according to the embodiment, and showing an opened state of the cabin.

A vehicle 1 according to this embodiment shown in FIGS. 1 to 3 is equipped with an opening/closing device 10. The opening/closing device 10 is switchable between a closed state in which a roof member 12 covers a top of a cabin 2 and an opened state in which the top of the cabin 2 is uncovered. The opening/closing device 10 includes a retractable roof 11, a deck cover 18, and a lock mechanism 20. First, these configurations basically in a state where the cabin 2 is closed (the state shown in FIG. 1) will be described.

<Retractable Roof>

Figure 4:
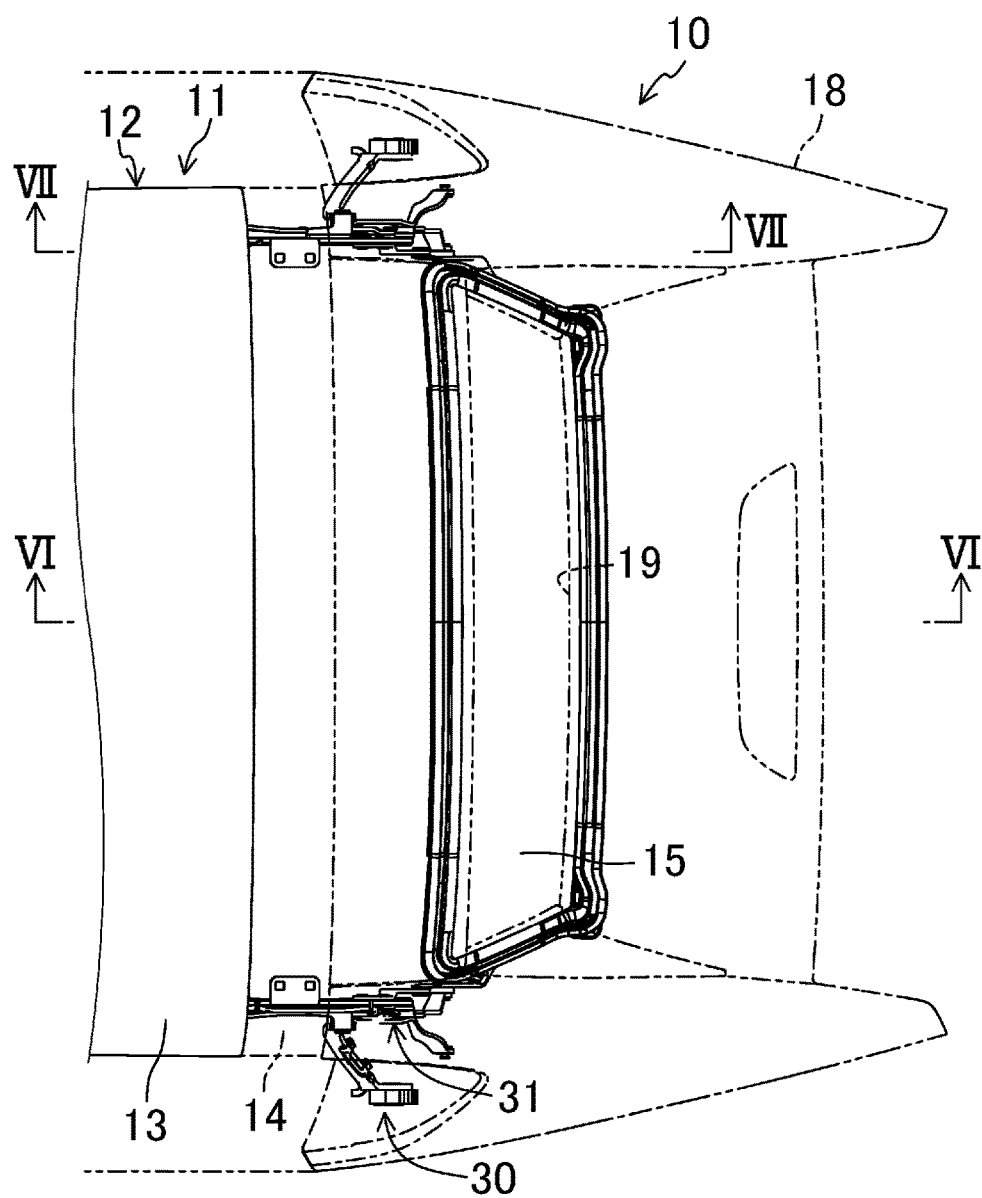
FIG. 4 is a plan view of the retractable roof.
Figure 5:
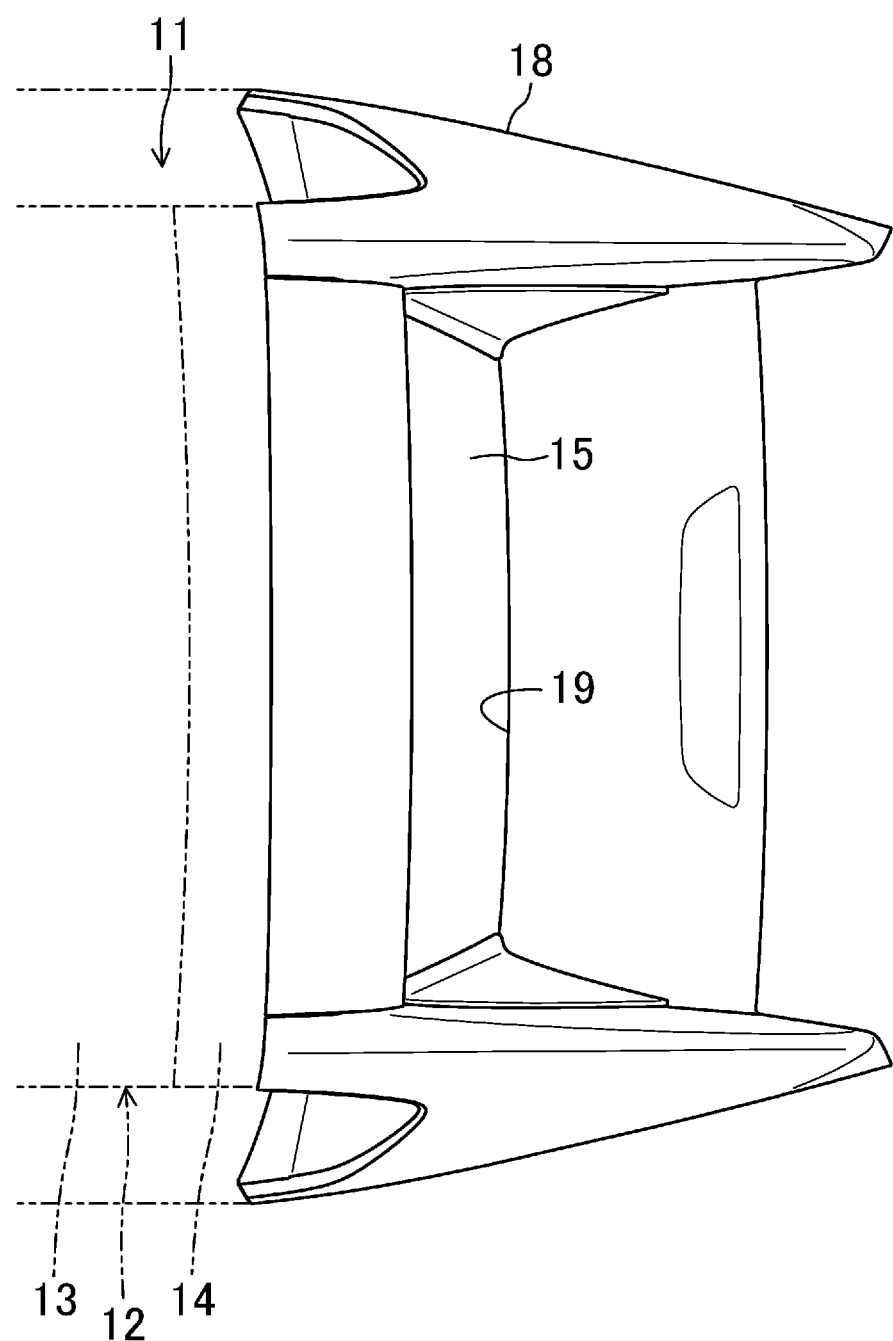
FIG. 5 is a plan view of the deck cover.
Figure 6:
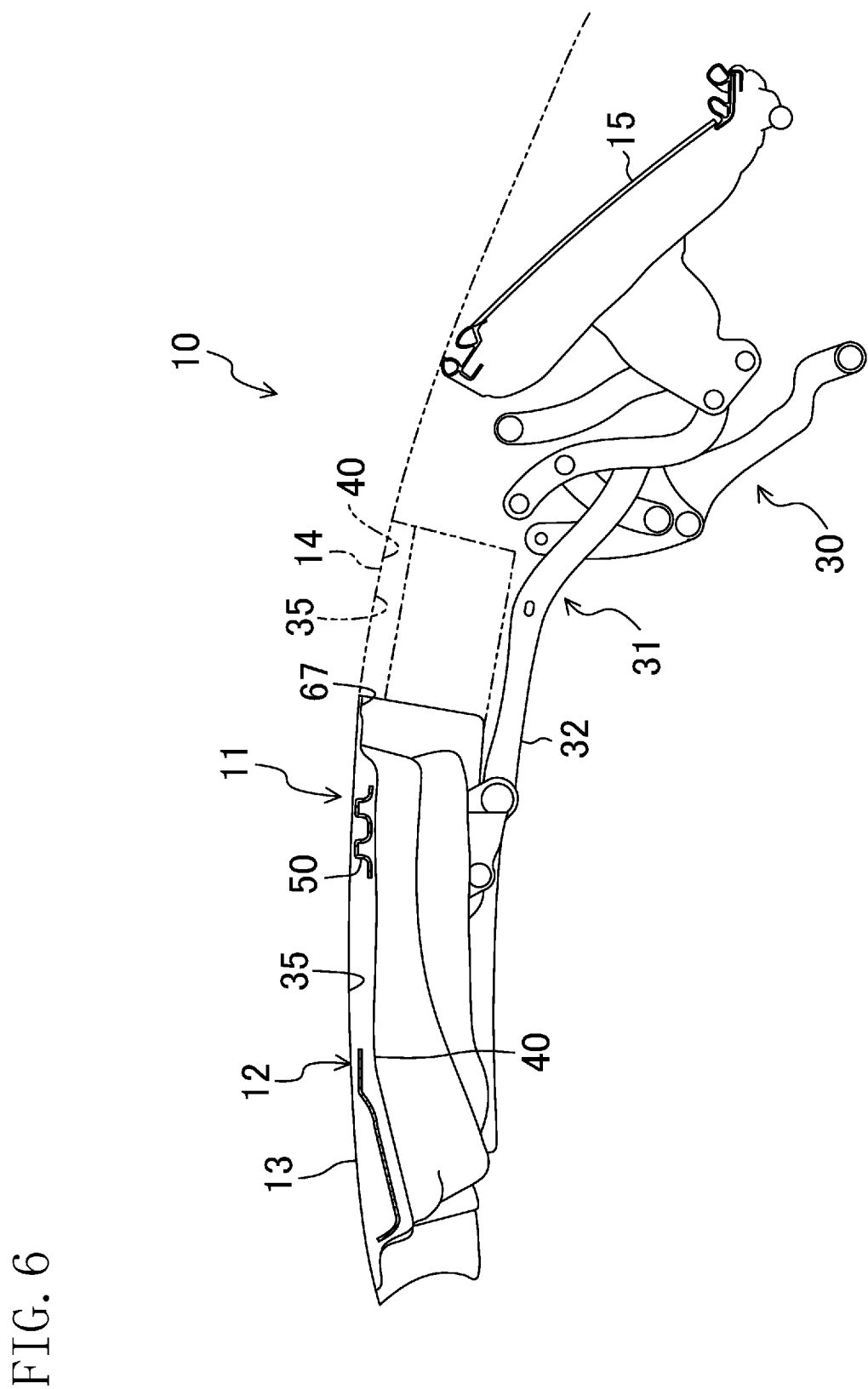
FIG. 6 is a sectional view taken along the line VI-VI of FIG. 4 (a sectional view of the retractable roof in a use position described later).
Figure 7:
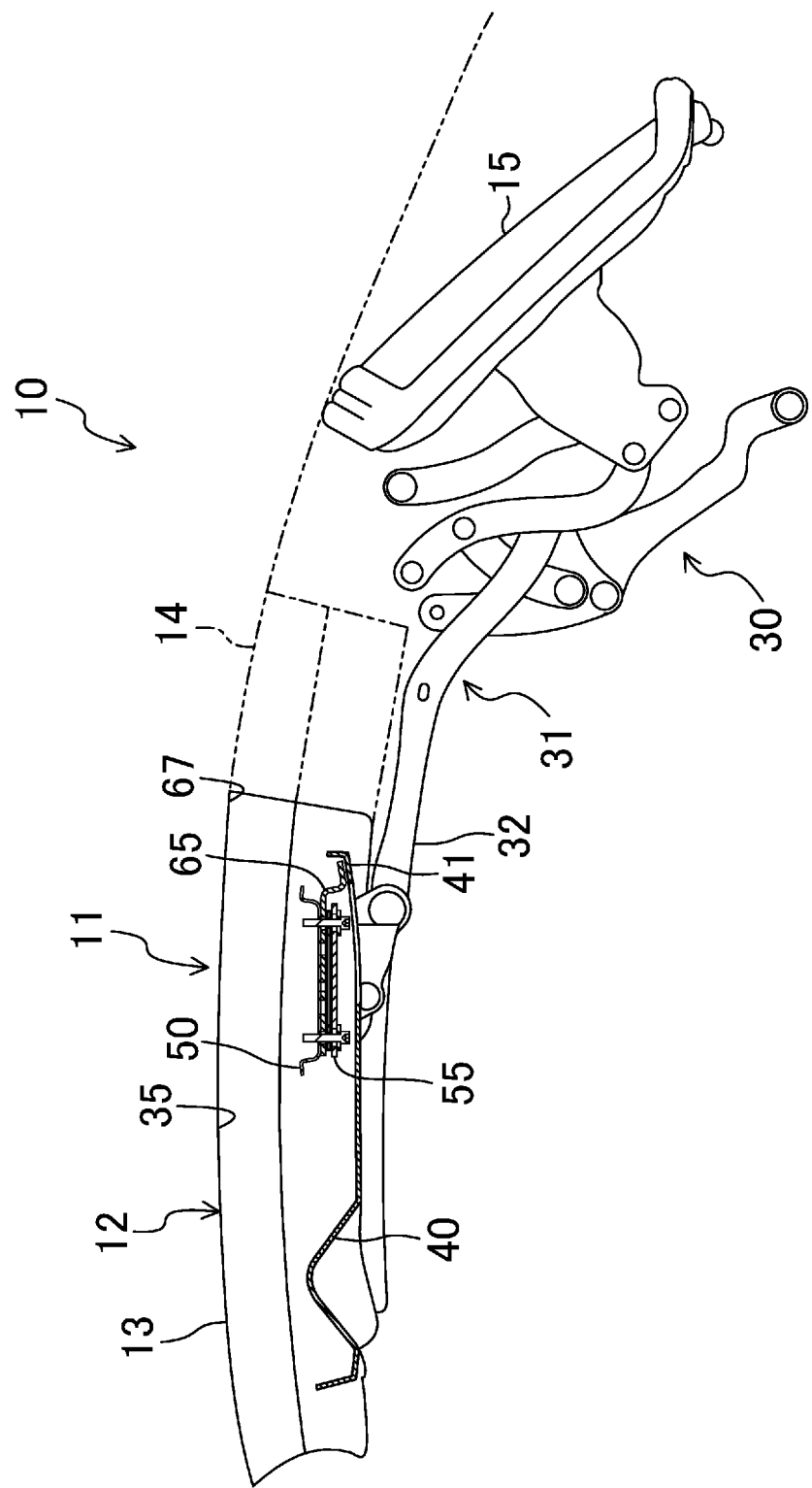
FIG. 7 is a cross-sectional view taken along the line VII-VII of FIG. 4.
Figure 8:
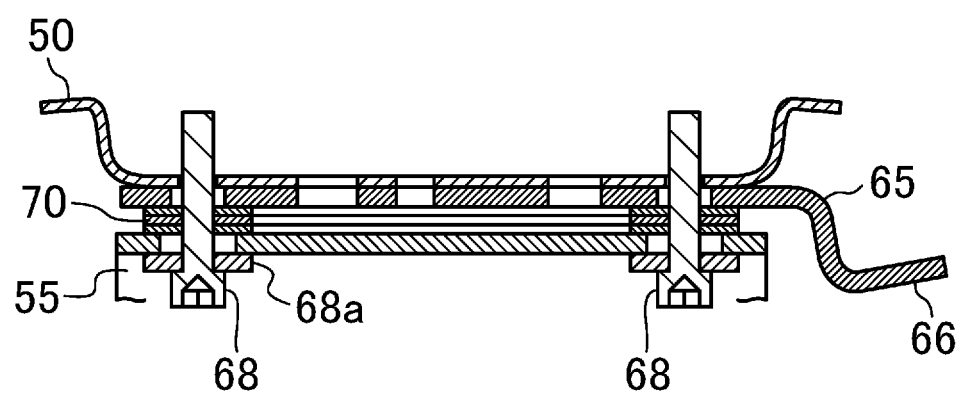
FIG. 8 is an enlarged sectional view of a main part of FIG. 7.
Figure 9:
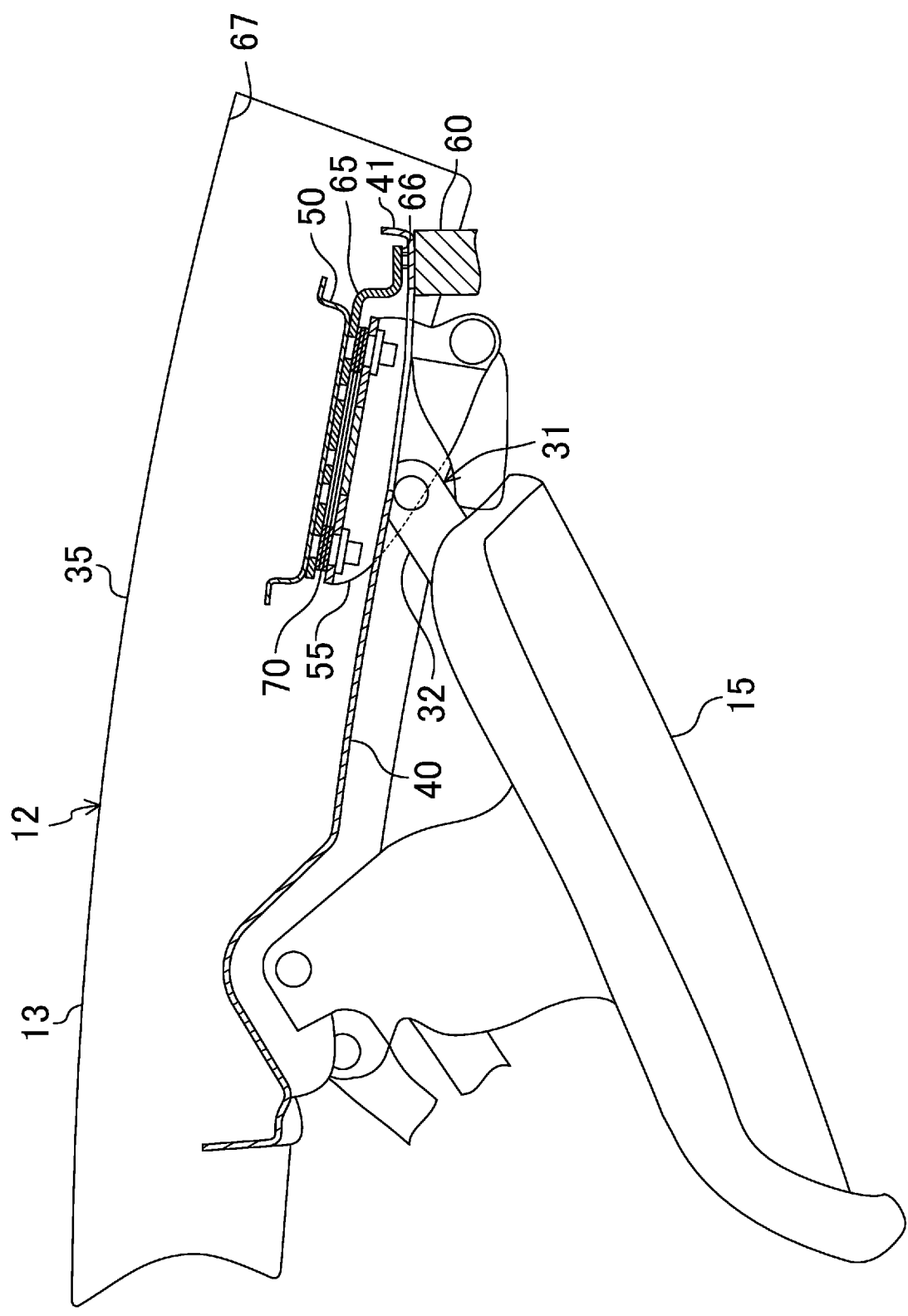
FIG. 9 is a cross-sectional view of the retractable roof in a retracted position described later.

FIG. 4 is a plan view of the retractable roof 11. FIG. 5 is a plan view of the deck cover. FIG. 6 is a sectional view taken along the line VI-VI of FIG. 4 (a sectional view of the retractable roof 11 in a use position described later) FIG. 7 is a sectional view taken along the line VII-VII of FIG. 4. FIG. 8 is an enlarged sectional view of a main part of FIG. 7. FIG. 9 is a sectional view of the retractable roof 11 in a retracted position described later.

The retractable roof 11 includes the roof member 12 and a back window 15 located behind the roof member 12. The roof member 12 extends in a longitudinal direction from an upper edge of a front header of the vehicle 1 to an upper edge of the deck cover 18. The roof member 12 includes a front roof panel 13 and a middle roof panel 14 disposed behind the front roof panel 13. The back window 15 is a transparent member, and disposed above a storage 4 formed in a rear portion of the vehicle 1.

The retractable roof 11 includes a roof drive mechanism 30 (see FIG. 4) capable of changing positions of the roof member 12 and the back window 15 between the use position (a fully closed position) in which the cabin is covered and the retracted position (a fully opened position) in which the cabin is opened. Specifically, the roof drive mechanism 30 includes a roof drive motor (not shown) and a roof link mechanism 31 which links the roof drive motor and the retractable roof 11 together. The roof link mechanism 31 transfers rotational power of the roof drive motor to the front roof panel 13, the middle roof panel 14, and the back window 15. Thus, the retractable roof 11 is movable between the use position (shown in FIG. 1) and the retracted position (shown in FIG. 3). The retractable roof 11 in the use position is located outside the storage 4 to cover the cabin 2. The retractable roof 11 in the retracted position is retracted into the storage 4, thereby uncovering the cabin 2.

The front roof panel 13 and the middle roof panel 14 of the roof member 12 includes an outer panel 35 located on the outer surface side of the vehicle body and an inner panel 40 located on the inner surface side. The middle roof panel 14 includes a reinforcing plate 50 fixed between the outer panel 35 and the inner panel 40. As shown in FIG. 7, the reinforcing plate 50 supports a roof bracket 55. The roof bracket 55 is linked with an arm 32 of the roof link mechanism 31 of the roof drive mechanism 30. The inner panel 40 is made of a light metal material such as aluminum, and the reinforcing plate 50 is made of a material, e.g., a steel plate, having higher rigidity than the inner panel 40.

As shown in FIG. 9, the retractable roof 11 includes a roof side stopper 65 coming into contact with a vehicle side stopper 60 at the retracted position. The roof side stopper 65 is fixed to the reinforcing plate 50 together with the roof bracket 55 by a bolt 68 and a washer 68a. The roof side stopper 65 includes a contact surface 66 coming into contact with the vehicle side stopper 60. The contact surface 66 is disposed at a position except for a sealing surface 67 provided on the roof member 12.

A shim plate 70 is mounted between the roof side stopper 65 and the roof bracket 55 to adjust a position of the roof side stopper 65. The number of the shim plates 70 can be changed to finely adjust the height of the contact surface 66 of the roof side stopper 65 and appropriately adjust the position with respect to the vehicle side stopper 60.

The inner panel 40 of the roof member 12 includes a flexible cover portion 41 that covers the contact surface 66 of the roof side stopper 65 from the cabin side. Because of this cover portion 41, the roof side stopper 65 is invisible from the cabin.

<Deck Cover>

As shown in FIG. 1, the deck cover 18 is disposed behind the roof member 12 and above the storage 4. Specifically, the deck cover 18 covers the cabin 2 from behind, and closes a top opening of the storage 4. The deck cover 18 is provided with a window frame 19 to be fitted with the back window 15.

The deck cover 18 is driven by a deck drive mechanism (not shown). Specifically, the deck drive mechanism includes a deck drive motor, and a deck link mechanism which links the deck drive motor and the deck cover 18 together. The deck link mechanism transfers rotational power of the deck drive motor to the deck cover 18. Thus, the deck cover 18 is movable between a home position (shown in FIGS. 1 and 3) and a retreated position (shown in FIG. 2, for example).

The deck cover 18 in the home position covers the top opening of the storage 4, and allows the back window 15 to be fitted in the window frame 19 in the deck cover 18. The deck cover 18 in the retreated position is located further rearward and obliquely upward than in the home position, and uncovers the top opening of the storage 4. Thus, the deck cover 18 in the retreated position allows the retractable roof 11 to move between the use position and the retracted position.

<Lock Mechanism>

The lock mechanism 20 is attached to a front end of a lower surface (surface toward the inside of the cabin) of the front roof panel 13. The lock mechanism 20 includes a hook member (not shown) which is able to engage with a striker (not shown) fixed to a body (front header 3) of the vehicle 1. When the retractable roof 11 is in the use position, the hook member engages with the striker so as to lock the roof member 12 and the front header 3 together.

—Operation of Opening/Closing Device—

The opening operation and the closing operation of the opening/closing device 10 will be described with reference to FIGS. 1 to 3. The "opening operation" is performed to bring the retractable roof 11 in the use position to the retracted position. The "closing operation" is performed to bring the retractable roof 11 in the retracted position to the use position.

In the opening operation, the lock mechanism 20 unlocks the front header 3. Further, the deck cover 18 in the home position moves toward the retreated position. Then, the retractable roof 11 in the use position moves toward the retracted position.

Specifically, the front roof panel 13, the middle roof panel 14, and the back window 15 independently pivot via a plurality of link members including arms 32 (see FIGS. 6 and 7) so that they move together toward the storage 4 (see, e.g., FIG. 2). When the front roof panel 13, the middle roof panel 14, and the back window 15 are stored in the storage 4 in a folded state, the deck cover 18 in the retreated position returns to the home position (see FIGS. 3 and 9). Thus, the cabin 2 is in the opened state.

At this time, the roof side stopper 65 comes into contact with the vehicle side stopper 60, and the components of the front roof 11 are retracted in the retracted position at appropriate positions. The height of the contact surface 66 of the roof side stopper 65 is adjusted by the shim plate 70 so that the components of the front roof 11 are retracted in the retracted position at appropriate positions.

To close the cabin 2 in the opened state, first, the deck cover 18 in the home position moves toward the retreated position. Next, the retractable roof 11 in the storage position moves toward the use position.

Specifically, the front roof panel 13, the middle roof panel 14, and the back window 15 independently pivot via the plurality of link members so that they move together toward the cabin 2 (see, e.g., FIG. 2). Thereafter, the retractable roof 11 reaches the use position, and the deck cover 18 in the retreated position returns to the home position (see FIGS. 1 and 7). Thus, the cabin 2 is in the closed state. Thereafter, the lock mechanism 20 is locked to the front header 3.

At this time, the roof side stopper 65 gradually moves away from the vehicle side stopper 60. When the retractable roof 11 is in the use position, the front roof panel 13 and the middle roof panel 14 of the roof member 12 are sealed with the sealing surface 67. In this state, the roof side stopper 65 is located at a position except for the sealing surface 67, and at the same time, the contact surface 66 is covered with the cover portion 41 of the inner panel 40 and is invisible from the cabin side.

Advantages of Embodiment

According to this embodiment, the reinforcing plate 50 of the roof member 12 supports the roof bracket 55 linked with the arm 32 of the roof link mechanism 31, and the reinforcing plate 50 is fixed between the outer panel 35 and the inner panel 40. Thus, when the roof link mechanism 31 is driven, the positions of the outer panel 35 and the inner panel 40 are changed via the reinforcing plate 50. Thus, in this embodiment, the reinforcing plate 50 receives the driving force of the roof link mechanism 31. Thus, even if the outer panel 35 of the roof member 12 is made of a light metal material such as aluminum, the deformation of the outer panel 35 can be reduced due to an excessively higher strength of the roof side stopper 65. Thus, the weight of the roof member 12 can be reduced, and also the roof side stopper can be fixed to the roof member.

In a typical configuration in which a roof side stopper made of a synthetic resin is attached to a link mechanism, the roof side stopper has a high degree of freedom of molding, and thus the contact surface for a vehicle side stopper can be easily provided in any position. However, if the design is changed so that the roof member is made of a light metal and the roof side stopper is provided on the roof member, the contact surface is not easily provided in any position. On the other hand, according to this embodiment, the roof side stopper 65 is provided on the reinforcing plate 50, and thus the roof side stopper 65 can be easily attached to the roof member 12 even if the roof member 12 is made of aluminum.

In this embodiment, as long as the contact surface 66 of the roof side stopper 65 is disposed at a position except for the sealing surface 67 of the roof member 12, the roof side stopper 65 itself can be formed in any shape. Thus, the roof side stopper 65 can be formed from a sheet metal member. Thus, the weight of the roof side stopper 65 itself can be more reduced than that of a typical one using a thick synthetic resin member. Accordingly, the weight of the retractable roof 11 can be reduced as a whole.

According to this embodiment, the shim plate 70 is mounted between the roof side stopper 65 and the reinforcing plate 50 to adjust a position of the roof side stopper 65. Thus, it is possible to finely adjust the position of the roof side stopper 65 only by adjusting the number of shim plates 70, and then possible to easily appropriately adjust the position of each member when the retractable roof 11 is in the fully opened position.

According to this embodiment, the inner panel 40 of the roof member 12 includes the flexible cover portion 41 that covers the contact surface 66 of the roof side stopper 65 from the cabin 2. Thus, the roof side stopper 65 is invisible from the cabin 2 when the retractable roof 11 is in the fully closed position. Thus, the appearance deterioration caused by the roof side stopper 65 can be reduced. In addition, when the retractable roof 11 is set to the fully opened position, the roof side stopper 65 comes into contact with the vehicle side stopper 60 via the flexible cover portion 41. This can prevent the cover portion 41 from interfering with the positioning of the retractable roof 11.

Another Embodiment

The above embodiment may be configured as follows.

Figure 10:
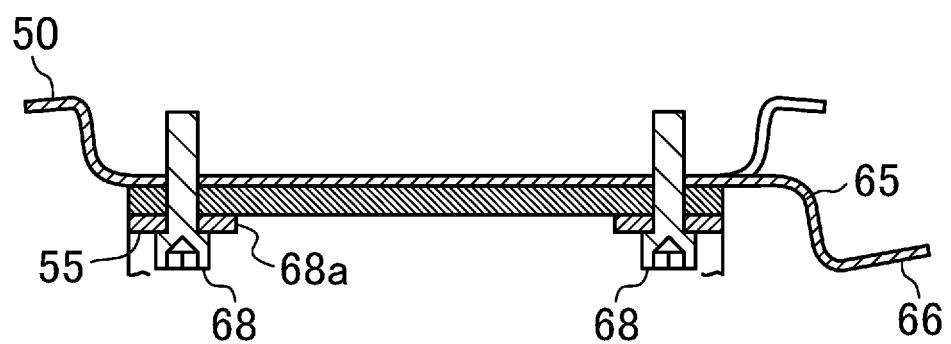
FIG. 10 is a cross-sectional view showing a variation of FIG. 8.

For example, in the above embodiment, the roof side stopper 65 is a member separated from the reinforcing plate 50. Alternatively, as shown in FIG. 10, the roof side stopper 65 may be a member integrated with the reinforcing plate 50 by cutting and raising a part of the reinforcing plate 50. Even in this case, the same advantage as that of the above embodiment can be obtained, and the configuration can be simplified as well.

INDUSTRIAL APPLICABILITY

As described above, the present disclosure is useful for a retractable roof having a roof side stopper that comes into contact with a vehicle side stopper at a fully opened position in which a cabin is opened.

DESCRIPTION OF REFERENCE CHARACTERS

1 Vehicle
2 Cabin
11 Retractable Roof
12 Roof Member
15 Back Window
30 Roof Drive Mechanism
31 Roof Link Mechanism
32 Arm
35 Outer Panel
40 Inner Panel
41 Cover Part
50 Reinforcing Panel
55 Roof Bracket
60 Vehicle Side Stopper
65 Roof Side Stopper
66 Contact Surface
67 Sealing Surface
70 Shim Plate

The invention claimed is:

1. A vehicle retractable roof, comprising:
    a roof member;
    a back window;
    a roof drive mechanism capable of changing positions of the roof member and the back window between a fully closed position in which a cabin is covered and a fully opened position in which the cabin is opened; and
    a roof side stopper coming into contact with a vehicle side stopper at the fully opened position, wherein
        the roof member includes
            an outer panel located on an outer surface side of a vehicle body,
            an inner panel located on an inner surface side of the vehicle body, and
            a reinforcing plate fixed between the outer panel and the inner panel and supporting a roof bracket linked with an arm of a link mechanism of the roof driving mechanism, and
        the roof side stopper
            includes a contact surface coming into contact with the vehicle side stopper and disposed at a position except for a sealing surface provided on the roof member.

2. The vehicle retractable roof according to claim 1, wherein
    the roof side stopper is integrated with the roof bracket.

3. The vehicle retractable roof according to claim 1, wherein:
    the roof side stopper is fixed to the reinforcing plate together with the roof bracket.

* * * * *